United States Patent
Arun et al.

(10) Patent No.: US 8,113,344 B2
(45) Date of Patent: Feb. 14, 2012

(54) PACKAGE FOR STORING DISCS

(75) Inventors: Kapur Arun, New Delhi (IN); Joginder Singh Dhaka, New Delhi (IN); Kaul Ram Rathi, New Delhi (IN)

(73) Assignee: Moser Baer India Limited, New Delhi (IN)

( * ) Notice: Subject to any disclaimer, the term of this patent is extended or adjusted under 35 U.S.C. 154(b) by 144 days.

(21) Appl. No.: 12/495,471

(22) Filed: Jun. 30, 2009

(65) Prior Publication Data

US 2009/0321288 A1 Dec. 31, 2009

(30) Foreign Application Priority Data

Jun. 30, 2008 (IN) ............................ 1582/CHE/2008

(51) Int. Cl.
*B65D 85/57* (2006.01)
(52) U.S. Cl. ..................... 206/308.1; 206/303; 206/493; 53/467
(58) Field of Classification Search .................. 206/303, 206/307, 307.1, 308.1, 1.5, 493; 53/467, 53/468, 476; 220/759; 211/40, 41.12, 41.14
See application file for complete search history.

(56) References Cited

U.S. PATENT DOCUMENTS

| | | | |
|---|---|---|---|
| 4,676,370 A * | 6/1987 | Rudick | 206/1.5 |
| 5,027,949 A * | 7/1991 | Terwilliger et al. | 206/406 |
| 5,480,068 A * | 1/1996 | Frazier et al. | 222/153.03 |
| 5,713,463 A * | 2/1998 | Lakoski et al. | 206/308.1 |
| 6,112,894 A * | 9/2000 | Kikuchi et al. | 206/308.1 |
| 6,915,898 B2 * | 7/2005 | Becker et al. | 206/310 |
| 6,979,031 B2 * | 12/2005 | Coppotelli et al. | 294/27.1 |
| 2001/0050239 A1 * | 12/2001 | Ishii | 206/308.1 |
| 2008/0017533 A1 * | 1/2008 | Hong | 206/307.1 |

* cited by examiner

*Primary Examiner* — Luan K Bui
(74) *Attorney, Agent, or Firm* — Antonio Papageorgiou; Ostrow Kaufman LLP

(57) ABSTRACT

A package, a system and method of manufacturing discs, the package for storing discs including: a base; a stem, the stem including: a first end including a first protruding portion of a first predetermined protruding shape; and a second end attached to the base, such that the stem is substantially perpendicular to the base; and a cover configured to be locked to the first end of the stem, the cover including a first hole of a first predetermined hole shape, having a shape configured to allow the first predetermined protruding shape to pass through the first hole; wherein the cover is configured to be placed over the stem, such that the first protruding portion enters into the first hole at an open position of the first hole, and the cover is configured to be rotated about a longitudinal axis of the stem, to lock the package at a locked position of the first hole such that the first protruding portion extends beyond at least a portion of the first hole.

14 Claims, 11 Drawing Sheets

PACKAGE FOR STORING DISCS

BACKGROUND

The embodiments herein relate, in general, to packaging. More particularly, the embodiments herein relate to a package for storing discs.

Optical discs, for example, are generally prone to damage from scratches and other types of exposure. In order to protect optical discs from damage, various disc packages have been designed to store optical discs. Some disc packages have been specifically designed to store a single disc or a small number of discs. Examples of such disc packages include, but are not limited to, jewel cases, keep cases, snap cases, and paper sleeves. Such disc packages are not suitable for storing a large number of discs because these disc packages are often further packaged together in large boxes.

Other disc packages, such as spindles and cake boxes, have been designed to store a large number of discs. A typical cake box includes a base with a central stem and a cylindrical cup. The central stem holds a stack of discs. In a conventional design, the cylindrical cup mates with the base, and is rotated clockwise and counter-clockwise to lock and unlock the cake box, respectively. In another conventional design, the central stem passes through a hole made at the centre of the cylindrical cup, and has threads made on its top. A bolt matching the threads is used to lock the cake box.

However, conventional designs employ a large amount of manufacturing material, which makes them heavy. In addition, most disc packages are often made of plastic. This makes them non-eco-friendly. Further, the locking and unlocking mechanisms used in some disc packages are often cumbersome and time-consuming for the user. Such locking and unlocking mechanisms are often susceptible to wear and tear with repeated use, and become unreliable with time. Moreover, some disc packages are susceptible to being unlocked unintentionally, thereby increasing the risk of damage to the discs contained within. Furthermore, conventional disc packages are often difficult to carry and handle. A user usually must carry such disc packages by holding the disc packages in his or her hands or resting the disc packages in his or her palms.

In light of the foregoing discussion, there is a need for a package for storing discs that is light weight, has a reliable and easy-to-use locking and unlocking mechanism, and is easy to carry and handle, compared to conventional disc packages.

SUMMARY

The embodiments provide a package for storing discs (and manufacturing and packaging methods and systems thereof).

The package could be light weight, compared to conventional disc packages. The package could reduce manufacturing costs by requiring less manufacturing materials.

The package could have a reliable and easy-to-use locking and unlocking mechanism, compared to conventional disc packages.

The package could be easy to carry and handle, compared to conventional disc packages.

Embodiments herein provide a package for storing discs. The package includes a base, a stem for holding the discs, and a cover. The stem includes a first end with a first protruding portion of a first predetermined protruding shape, and a second end attached to the base, such that the stem is substantially perpendicular to the base. The cover includes a first hole having a shape configured to allow the first predetermined protruding shape to pass through the first hole, and is configured to be locked to the first end of the stem. The cover is configured to be placed over the stem such that the first protruding portion enters into the first hole at an open position of the first hole, and the cover is configured to be rotated about a longitudinal axis of the stem to lock the package at a locked position of the first hole such that the first protruding portion extends beyond at least a portion of the first hole. The cover could be rotated about the longitudinal axis of the stem to unlock the package at the open position. The cover may, for example, be rotated at an angle of rotation ranging between 20 degrees and 360 degrees, to lock and unlock the package. In this way, the stem and the cover provide an easy-to-use locking and unlocking mechanism.

In accordance with an embodiment, the cover includes a recessed portion adjacent to the first hole on which the protruding portion rests in the locked position. This avoids any accidental unlocking of the package, while it is being carried. This makes the locking and unlocking mechanism reliable.

In accordance with an embodiment, the package further includes a handle for carrying the package. The handle may, for example, be detachably attached to the cover. This makes the package easy to carry and handle.

In accordance with an embodiment, the second end of the stem is integrally attached or molded to the base such that the base and stem are a one piece unitary structure.

In accordance with another embodiment, the stem could be detachably attached to the base. In such a case, the second end of the stem includes a second protruding portion of a second predetermined protruding shape, and the base includes a second hole having a shape configured to allow the second predetermined protruding shape to pass through the second hole. The stem is configured to be placed over the base such that the second protruding portion enters into the second hole. The base is configured to be rotated about a longitudinal axis of the stem, to detachably attach the second end of the stem to the base.

In accordance with an embodiment, the stem has a predetermined length being based on at least one of the following: (a) the maximum number of discs to be stored, (b) the type of the discs, and (c) the thickness of the discs. In accordance with another embodiment, the stem includes a plurality of hollow tubes that are arranged one within another, and are configured to slide one within another to adjust the length of the stem.

In accordance with an embodiment, the stem includes a plurality of hollow tubes arranged one within another, the hollow tubes are configured to slide one within another, to adjust the length of the stem.

In accordance with an embodiment, the base and the cover have a predetermined base radius and a predetermined cover radius, respectively, which are based on the radius of discs to be stored.

In accordance with an embodiment, the first hole of the cover is non-threaded.

Embodiments herein also provide a system and method for packaging discs in the package. The system includes a disc-arranging unit, a cover-placing unit and a cover-rotating unit. The disc-arranging unit is configured to arrange the discs one above another in a stack. The discs are held together with the stem. The cover-placing unit is configured to place the cover over the stem, such that the protruding portion enters into the hole at an open position of the hole. The cover-rotating unit is configured to rotate the cover about a longitudinal axis of the stem to lock the cover to the stem at a locked position of the hole, such that the protruding portion extends beyond at least a portion of the hole.

The method includes arranging the discs one above another in a stack; placing the cover over the stem, such that the protruding portion enters into the hole at the open position of the hole; and rotating the cover about the longitudinal axis of the stem to lock the cover to the stem at the locked position of the hole, such that the protruding portion extends beyond at least a portion of the hole.

In accordance with an embodiment, the stem is integrally attached or molded to the base, such that the base and stem are a one piece unitary structure.

Embodiments herein further provide a system and method for manufacturing a package for storing discs. The system includes a molding module, a cover-molding unit, a cover-placing unit and a cover-rotating unit. The molding module is configured to mold a base-stem unit for holding the discs. The molding module includes a base-molding unit configured to mold a base, and a stem-molding unit configured to mold a stem having a protruding portion at one end of the stem. The base and the stem together form the base-stem unit, where the stem is substantially perpendicular to the base. In accordance with an embodiment, the molding module further includes an attaching unit configured to attach the stem to the base to form the base-stem unit. The cover-molding unit is configured to mold a cover, and form a hole having a shape configured to allow the protruding shape to pass through the hole.

The cover-placing unit is configured to place the cover over the stem, such that the protruding portion enters into the hole at an open position of the hole. The cover-rotating unit is configured to rotate the cover about a longitudinal axis of the stem to lock the cover to the stem at a locked position of the hole, such that the protruding portion extends beyond at least a portion of the hole.

In accordance with an embodiment, the system further includes a handle-molding unit configured to mold a handle; and a handle-attaching unit configured to attach the handle to the cover. The handle may, for example, be detachably attached to the cover.

The method includes molding a base-stem unit for holding the discs; and molding a cover configured to be locked to a stem. The step of molding the base-stem unit includes molding a base; and molding the stem and forming a protruding portion at one end of the stem. The base and the stem together form the base-stem unit, where the stem is substantially perpendicular to the base. In accordance with an embodiment, the step of molding the base-stem unit further includes attaching the stem to the base to form the base-stem unit. In addition, the cover includes a hole having a shape configured to allow the protruding shape to pass through the hole. The method also includes placing the cover over the stem, such that the protruding portion enters into the hole at an open position of the hole; and rotating the cover about a longitudinal axis of the stem to lock the cover to the stem at a locked position of the hole, such that the protruding portion extends beyond at least a portion of the hole.

In accordance with an embodiment, the method further includes molding a handle for carrying the package; and attaching the handle to the cover. The handle may, for example, be detachably attached to the cover.

In accordance with an embodiment, the stem is integrally attached or molded to the base such that the base and stem are a one piece unitary structure.

Furthermore, the package so designed requires less manufacturing materials, compared to conventional disc packages. This, in turn, could make the package light weight.

BRIEF DESCRIPTION OF DRAWINGS

Embodiments will hereinafter be described in conjunction with the appended drawings provided to illustrate and not to limit the present invention, wherein like designations denote like elements, and in which.

DETAILED DESCRIPTION

Figure 1:
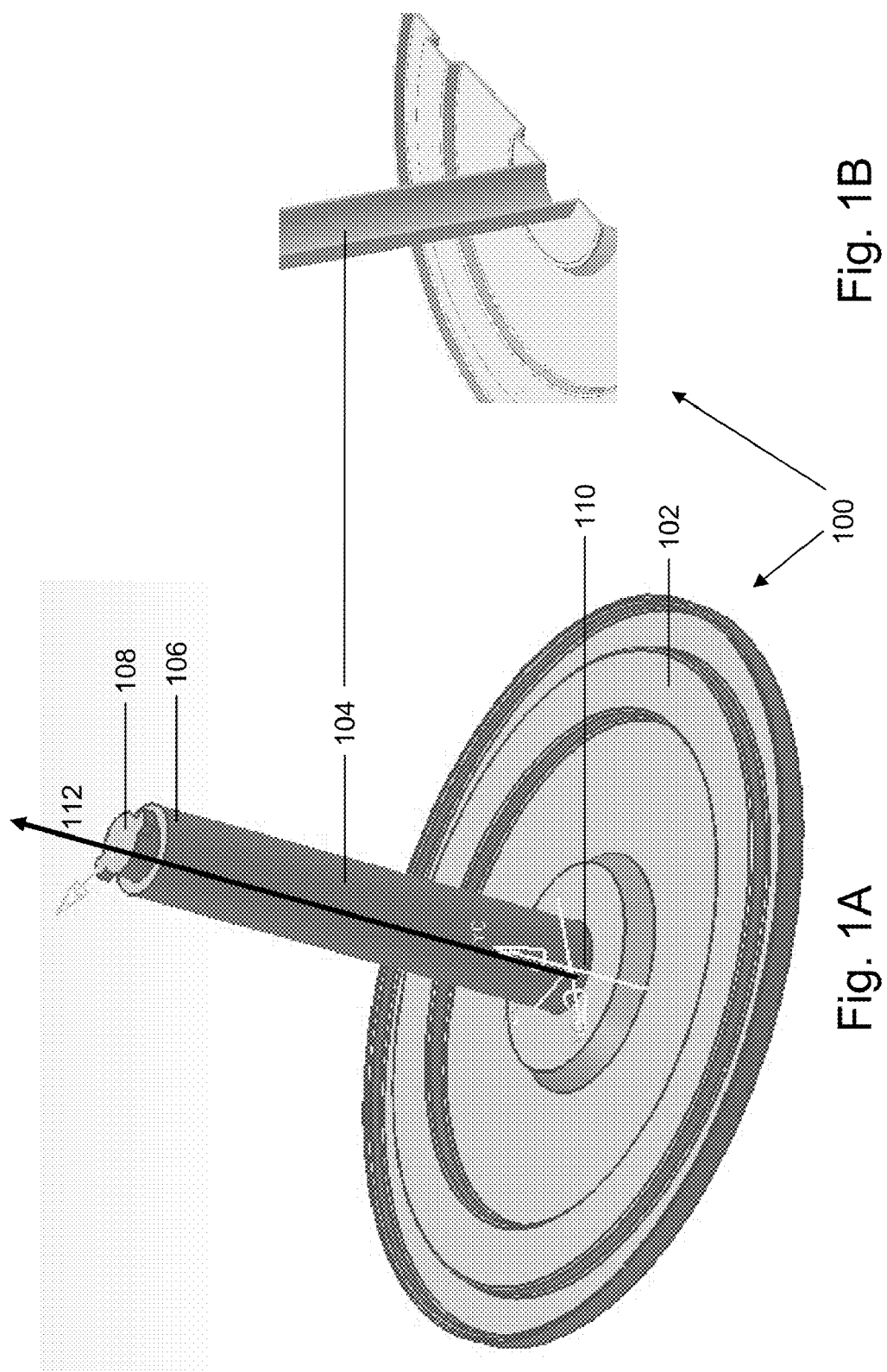
FIG. 1A illustrates perspective view of a base-stem unit.
FIG. 1B illustrates a cross-sectional view of the base-stem unit, in accordance with an embodiment.

As used in the specification and claims, the singular forms "a", "an" and "the" include plural references unless the context clearly dictates otherwise. For example, the term "a package" may include a plurality of packages unless the context clearly dictates otherwise.

Embodiments provide a package for storing discs, a method and system for manufacturing a package for storing discs, and a method and system for packaging discs in a package. In the description herein for embodiments, numerous specific details are provided, such as examples of components and/or mechanisms, to provide a thorough understanding of embodiments. One skilled in the relevant art will recognize, however, that an embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments.

The following terms may be defined as follows:

Package: A package could be a device for storing a plurality of discs.

Base-stem unit: A base-stem unit could be a unit that includes a base and a stem.

Base: A base could be a device for providing support to the package.

Stem: A stem could be a device for holding the discs. The stem could be substantially perpendicular to the base.

Protruding portion: A protruding portion could be a three-dimensional portion that protrudes from one end of the stem. The protruding portion has a predetermined protruding shape.

Cover: A cover could be a device for covering the discs and is configured to be locked to the stem.

Hole: A hole could be an opening through the cover. The hole could have a shape configured to allow the predetermined protruding shape to pass through the hole.

Open position: An open position could be a position in which the protruding portion is entered into the hole or is removed from the hole.

Locked position: A locked position could be a position in which the protruding portion is locked to the hole. The locked position generally could range between 20 degrees and 340 degrees.

Recessed portion: A recessed portion could be a three-dimensional portion that recesses in the cover. The protruding portion could rest on the recessed portion in the locked position. The recessed portion could have a predetermined recessed shape that is complementary to the predetermined protruding shape.

Ridge: A ridge could be a three-dimensional portion that protrudes from the surface of the cover.

Cavity: A cavity could be a three-dimensional hollow space formed on the ridge.

Handle: A handle could be a device for carrying the package. The handle could be configured to be detachably attached to the cover.

Flexible element: A flexible element could be a portion of the handle that can be flexibly fitted into the cavity on the ridge.

Disc-arranging unit: An disc-arranging unit could be a unit for arranging discs one above another in a stack, and placing them over the base.

Cover-placing unit: A cover-placing unit could be a unit for aligning and placing the cover over the stem, such that the protruding portion enters into the hole at the open position.

Cover-rotating unit: A cover-rotating unit could be a unit for rotating the cover about a longitudinal axis of the stem, to lock the cover to the stem at the locked position.

Molding module: A molding module could be a module for molding a base-stem unit.

Base-molding unit: A base-molding unit could be a unit for molding a base.

Stem-molding unit: A stem-molding unit could be a unit for molding a stem, and forming a protruding portion over the stem.

Attaching unit: An attaching unit could be a unit for attaching the stem to the base to form the base-stem unit.

Cover-molding unit: A cover-molding unit could be a unit for molding a cover, and forming a hole having a shape configured to allow the protruding portion to pass through the hole.

Handle-molding unit: A handle-molding unit could be a unit for molding a handle.

Handle-attaching unit: A handle-attaching unit could be a unit for attaching the handle to the cover.

The package includes a base for providing support, a stem for holding discs, and a cover configured to be locked to the stem. The stem includes a first end with a first protruding portion of a first predetermined protruding shape. The stem includes a second end attached to the base, such that the stem is substantially perpendicular to the base. The cover includes a first hole having a shape configured to allow the first predetermined protruding shape to pass through the first hole. The cover is configured to be placed over the stem, such that the first protruding portion enters into the first hole at an open position. The cover is configured to be rotated about a longitudinal axis of the stem, to lock the package at a locked position of the first hole such that the first protruding portion extends beyond at least a portion of the first hole. The cover may be rotated about the longitudinal axis of the stem to unlock the package at the open position. The cover may, for example, be rotated at an angle of rotation ranging between 20 degrees and 360 degrees, to lock and unlock the package. In this way, the design of the stem and the cover provides a locking and unlocking mechanism that is easy to use.

In accordance with an embodiment, the cover includes a recessed portion adjacent to the first hole on which the first protruding portion rests in the locked position. The recessed portion may, for example, have a predetermined recessed shape that is complementary to the first predetermined protruding shape.

In addition, the first predetermined protruding shape could substantially match and fit into a first predetermined hole shape of the first hole, in accordance with an embodiment. The first predetermined protruding shape may, for example, be a rectangular shape, or a concave polygonal shape in cross-section, such as a Y-shape, an X-shape, and their variations. The first predetermined hole shape could be substantially similar to the first predetermined protruding shape, in accordance with an embodiment. The first hole may be slightly larger than the first protruding portion, enabling the first protruding portion to enter smoothly into the first hole at the open position.

In accordance with an embodiment, the package further includes a handle for carrying the package. The handle may, for example, be configured to be detachably attached to the cover.

In accordance with an embodiment, the stem substantially perpendicularly extends from a central longitudinal axis of the base. The second end of the stem could be integrally attached or molded to the base such that the base and stem are a one piece unitary structure. In accordance with another embodiment, the stem is detachably attached to the base. In such a case, the second end of the stem includes a second protruding portion of a second predetermined protruding shape, and the base includes a second hole having a shape configured to allow the second predetermined protruding shape to pass through the second hole. The stem is configured to be placed over the base, such that the second protruding portion is configured to enter the second hole. The base is configured to be rotated about the longitudinal axis of the stem, to detachably attach the second end of the stem to the base.

Discs are available in various types and sizes. Examples of discs include, but are not limited to, Compact Discs (CDs), Digital Versatile Discs (DVDs), High-Definition DVDs (HD-DVDs), High-Definition Versatile Discs (HVDs), Blu-ray Discs (BDs), MiniDiscs (MDs), Universal Media Discs (UMDs), and Laser Discs (LDs). The radius of discs may, for example, range between 30 mm and 60 mm. Accordingly, a predetermined base radius and a predetermined cover radius of the base and the cover, respectively, are based on the radius of discs to be stored, in accordance with an embodiment.

Further, packages can be made available for different numbers of discs. The maximum number of discs to be stored in a package may, for example, range between 5 and 150. In order to accommodate the desired number of discs, the length of the stem may be chosen accordingly. In accordance with an embodiment, the stem has a predetermined length being based on at least one of the following: (a) the maximum number of discs to be stored, (b) the type of the discs, and (c) the thickness of the discs. In accordance with another embodiment, the stem includes a plurality of hollow tubes that are arranged one within another, and are configured to slide one within another to adjust the length of the stem.

FIG. 1A illustrates a base-stem unit 100, in accordance with an embodiment. Base-stem unit 100 includes a base 102 and a stem 104 for holding discs. Stem 104 includes a first end 106, which has a first protruding portion 108. In addition, stem 104 includes a second end 110 attached to base 102, such that stem 104 is substantially perpendicular to base 102. FIG. 1A shows a longitudinal axis 112 of stem 104.

As shown in FIG. 1A, first protruding portion 108 has a radial shape that extends from a circular central portion in two opposite directions. First protruding portion 108 may, for example, be of any other suitable shape, such as a rectangular shape, or a concave polygonal shape in cross-section.

In accordance with an embodiment, stem 104 has a predetermined length being based on at least one of the following: (a) the maximum number of discs to be stored, (b) the type of the discs, and (c) the thickness of the discs. Examples of discs include, but are not limited to, Compact Discs (CDs), Digital Versatile Discs (DVDs), High-Definition DVDs (HD-DVDs), High-Definition Versatile Discs (HVDs), Blu-ray Discs (BDs), MiniDiscs (MDs), Universal Media Discs (UMDs), and Laser Discs (LDs).

In accordance with another embodiment, stem 104 includes a plurality of hollow tubes, such as 204 (shown in FIGS. 2A and 2B) that are arranged one within another, and are configured to slide one within another to adjust the length of stem 104. The length of the stem may be adjusted to accommodate changing numbers of discs to be held.

FIG. 1B illustrates a cross-sectional view through base-stem unit 100, in accordance with an embodiment. With reference to FIG. 1B, stem 104 is a hollow tube. It should be noted here that stem 104 may be a hollow or solid tube of any desired shape and size. Stem 104 may, for example, have a circular shape, an elliptical shape, a triangular shape, a rectangular shape or any other polygonal shape in cross-section. As discs generally have a circular punch area at their centre, stem 104 may be formed as a tube with a circular shape, as shown in FIGS. 1A and 1B.

In addition, base 102 may be made in any desired shape and size. As discs are generally circular in shape, base 102 may be made circular in shape. Accordingly, base 102 may have a predetermined base radius (not shown), depending on the radius of discs to be stored.

In another embodiment, a separate cap (not shown) with first protruding portion 108 can be made and detachably attached to first end 106 of stem 104. FIGS. 1A and 1B are merely an example, which should not unduly limit the scope of the claims herein. One of ordinary skill in the art would recognize many variations, alternatives, and modifications of embodiments.

Figure 2:
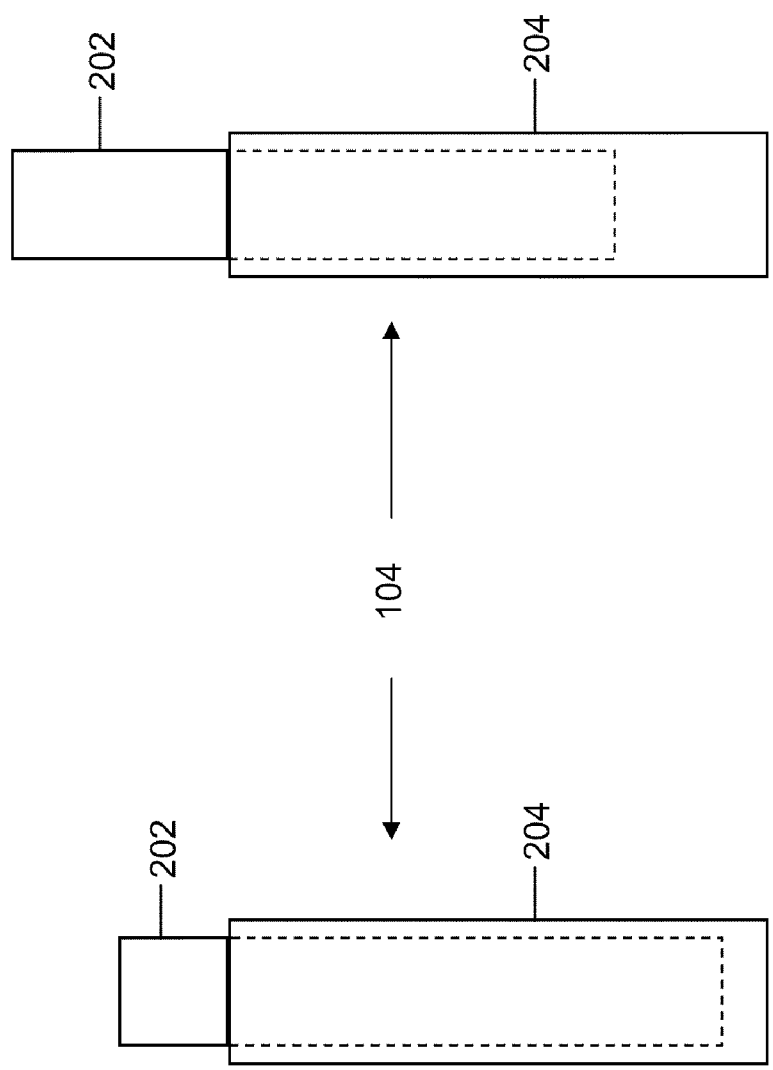
FIGS. 2A and 2B are cross-sectional views illustrating a portion of a stem, in accordance with another embodiment.

FIGS. 2A and 2B are cross-sectional views illustrating a portion of stem 104, in accordance with another embodiment. With reference to FIG. 2A, a hollow tube 202 is arranged within another hollow tube 204. Hollow tube 202 may slide out from hollow tube 204, as shown in FIG. 2B. In this way, hollow tube 202 may slide within or out from hollow tube 204 to adjust the length of stem 104, as and when required.

Figure 3:
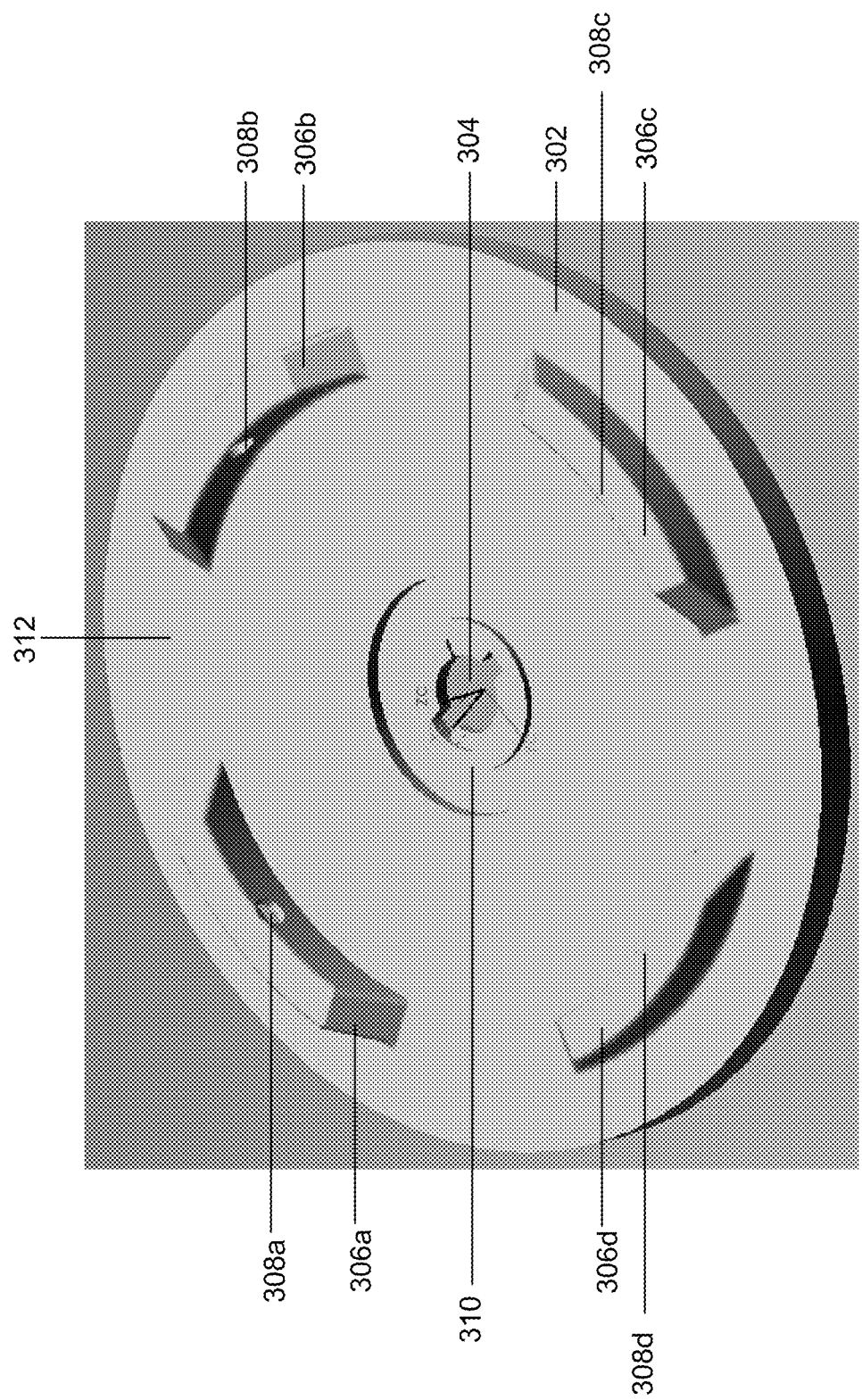
FIG. 3 illustrates a cover configured to be locked to a stem, in accordance with an embodiment.

FIG. 3 illustrates a cover 302 configured to be locked to stem 104, in accordance with an embodiment. Cover 302 includes a first hole 304 having a shape configured to allow first protruding portion 108 (shown in FIGS. 1A and 1B) to pass through. As shown in FIG. 3, first hole 304 has a radial shape that is similar to the shape and size of first protruding portion 108. First hole 304 may be formed slightly larger than first protruding portion 108, enabling first protruding portion 108 to enter smoothly into first hole 304. In embodiment shown in FIG. 3, the first hole 304 is non-threaded.

With reference to FIG. 3, cover 302 also includes a plurality of ridges, shown as a ridge 306a, a ridge 306b, a ridge 306c and a ridge 306d. Each ridge 306a, 306b, 306c, and 306d has a cavity 308a, 308b, 308c (obstructed from view by ridge 306c), and 308d (obstructed from view by ridge 306d), respectively, formed on its inner side for attaching a handle 402 (shown in FIG. 4) to cover 302.

FIG. 3 is merely an example, which should not unduly limit the scope of the claims herein. One of ordinary skill in the art would recognize many variations, alternatives, and modifications of embodiments.

Figure 4:
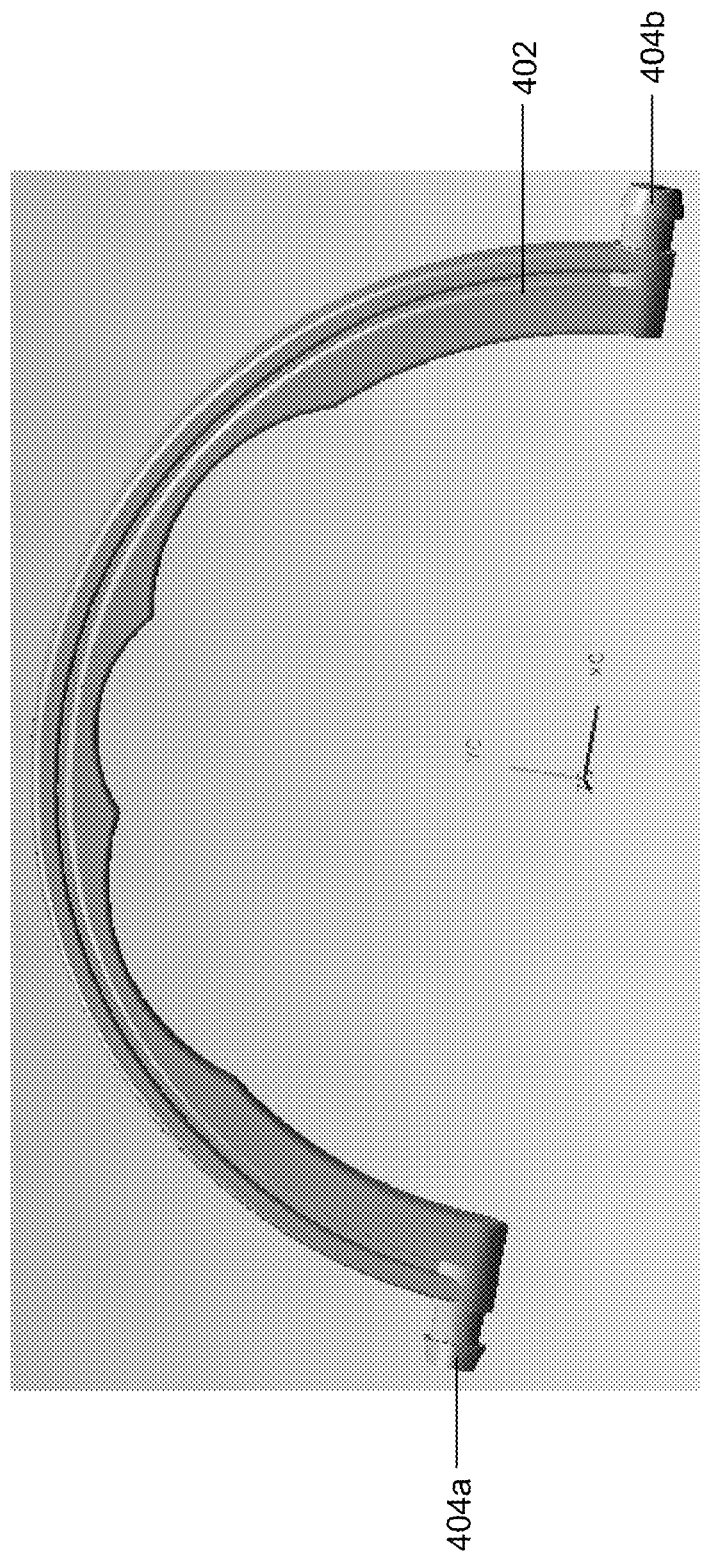
FIG. 4 illustrates a handle configured to be detachably attached to the cover, in accordance with an embodiment.

FIG. 4 illustrates a handle 402 configured to be detachably attached to cover 302, in accordance with an embodiment. With reference to FIG. 4, handle 402 is semi-circular in shape, and has a flexible element 404a and a flexible element 404b. Flexible element 404a and flexible element 404b are configured to fit into cavities formed on opposite ridges, such as ridge 306a (shown in FIG. 3) and ridge 306c (shown in FIG. 3), on cover 302 (shown in FIG. 3).

Handle 402 may, for example, be designed ergonomically to be gripped easily by fingers. For this purpose, three curves have been formed on the inner part of handle 402, as shown in FIG. 4.

FIG. 4 is merely an example, which should not unduly limit the scope of the claims herein. One of ordinary skill in the art would recognize many variations, alternatives, and modifications of embodiments. For example, handle 402 may be made in any suitable shape and size.

Figure 5:
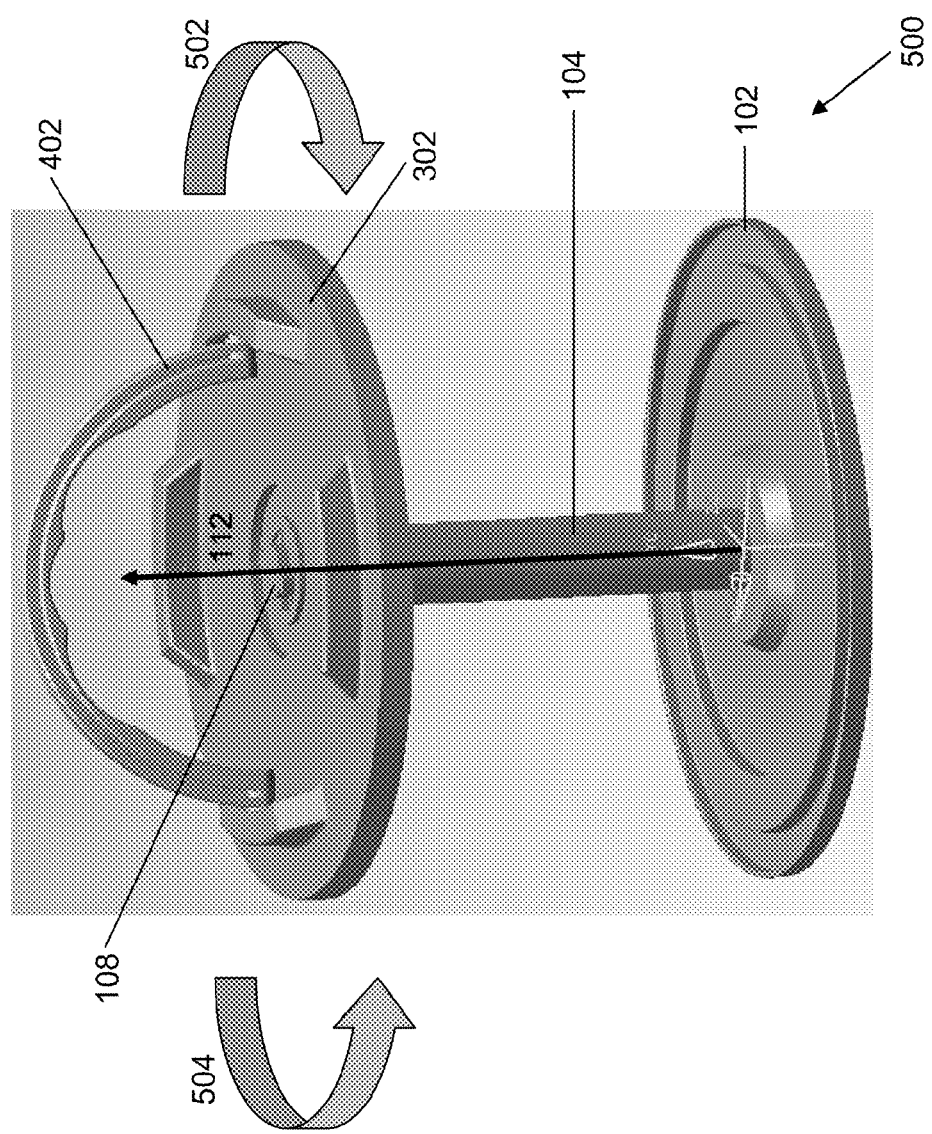
FIG. 5 illustrates a package for storing discs, in accordance with an embodiment.

FIG. 5 illustrates a package 500 for storing discs, in accordance with an embodiment. Cover 302 is configured to be placed over stem 104, such that first protruding portion 108 enters into first hole 304 (shown in FIG. 3) such that package 500 is in an unlocked position wherein cover 302 and stem 104 are oriented relative to each other such that protruding portion 108 and first hole 304 are aligned with each other. In the open position, the protruding portion 108 is configured to be inserted through first hole 304 and/or removed from first hole 304. To lock package 500 in a locked position, cover 302 is configured to be rotated about longitudinal axis 112 of stem 104 in either a clockwise or counter-clockwise direction about longitudinal axis 112 of stem 104, as depicted by an arrow 502 and an arrow 504, respectively. Cover 302 may be rotated about longitudinal axis 112 of stem 104 to unlock package 500 at the unlocked position. Cover 302 may, for example, be rotated at an angle of rotation ranging between 20 degrees and 360 degrees, to lock and unlock package 500. The locked position may generally range between 20 degrees and 340 degrees from the unlocked position.

In accordance with an embodiment, cover 302 includes a recessed portion 310 (shown in FIG. 3) adjacent to first hole 304 on which first protruding portion 108 rests in the locked position. Recessed portion 310 may, for example, have a recessed shape that is complementary to the shape of first protruding portion 108. Recessed portion 310 is located at a substantially centered position on cover 302 and is disposed below the top surface 312 (shown in FIG. 3) of cover 302.

In accordance with an embodiment, stem 104 is affixed to base 102 so as to be substantially perpendicular to base 102. In accordance with another embodiment, stem 104 is detachably attached to base 102. In such a case, second end 110 of stem 104 includes a second protruding portion (not shown), and base 102 includes a second hole (not shown) having a shape configured to allow the second protruding portion to pass through the second hole. Stem 104 is configured to be placed over base 102, such that the second protruding portion enters the second hole. Base 102 is configured to be rotated about longitudinal axis 112 of stem 104, to detachably attach second end 110 (shown in FIG. 1A) of stem 104 to base 102.

In accordance with an embodiment, base 102 and cover 302 have a predetermined base radius and a predetermined cover radius, which are based on the radius of discs to be stored in package 500. The radius of discs may, for example, range between 30 mm and 60 mm.

As mentioned above, the length of stem 104 may be either fixed or adjustable. The length of the stem may be adjusted to accommodate changing numbers of discs to be stored. Stem 104 may be accordingly configured to hold a desired number of discs. For example, package 500 may be used to store any number of discs, ranging between 5 and 150.

Package 500 may also include a hollow cylindrical frame configured to be surrounded by discs stored in package 500, to avoid dirt from entering into package 500.

Various components of package 500, such as base 102, stem 104, cover 302 and handle 402, may be made from the same manufacturing material. Alternatively, different components of package 500 may be made from different manufacturing materials, depending on their desired characteristics, such as strength, flexibility, etc. Examples of manufacturing materials include, but are not limited to, plastics, polypropylene, polystyrene, polycarbonates, metals, metallic alloys, ceramics, wood, cardboard, and composites.

FIG. 5 is merely an example, which should not unduly limit the scope of the claims herein. Package 500 may be configured to store any type of disc. Examples of discs include, but are not limited to, Compact Discs (CDs), Digital Versatile Discs (DVDs), High-Definition DVDs (HD-DVDs), High-Definition Versatile Discs (HVDs), Blu-ray Discs (BDs), MiniDiscs (MDs), Universal Media Discs (UMDs), and Laser Discs (LDs). One of ordinary skill in the art would recognize many variations, alternatives, and modifications of embodiments.

Various embodiments provide a package for storing discs. The package includes supporting means for providing support, holding means for holding the discs, and covering means. The holding means includes a first end with a protruding portion, and a second end attached to the supporting means. The holding means is configured to be attached substantially perpendicular to the supporting means. The covering means includes a hole having a shape configured to allow the protruding portion to pass through, and is configured to be locked to the first end of the holding means. The covering means is configured to be placed over the holding means, such that the protruding portion enters into the hole at an open position. The covering means is configured to be rotated about a longitudinal axis of the holding means, to lock the package at a locked position.

The package also includes carrying means for carrying the package, in accordance with an embodiment. The carrying means may be configured to be detachably attached to the covering means.

An example of the supporting means may be, but not limited to, base 102. An example of the holding means is, but not limited to, stem 104. An example of the covering means may be, but not limited to, cover 302. An example of the carrying means is, but not limited to, handle 402.

Figure 6:
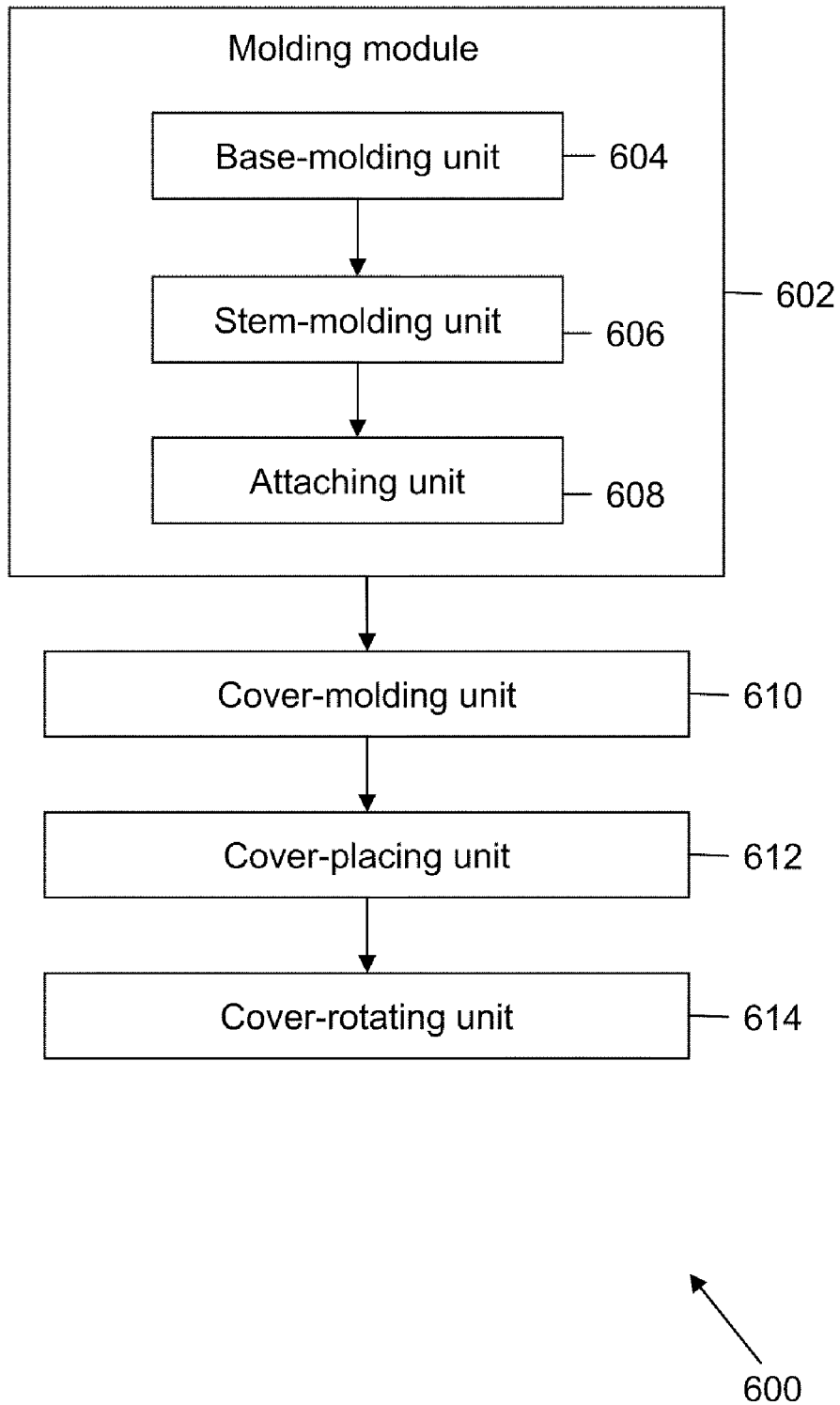
FIG. 6 illustrates a system for manufacturing a package for storing discs, in accordance with an embodiment.

FIG. 6 illustrates a system 600 for manufacturing a package for storing discs, in accordance with an embodiment. System 600 includes a molding module 602 configured to mold a base-stem unit for holding the discs. Molding module 602 includes a base-molding unit 604, a stem-molding unit 606 and an attaching unit 608. System 600 also includes a cover-molding unit 610, a cover-placing unit 612 and a cover-rotating unit 614.

Base-molding unit 604 is configured to mold a base, while stem-molding unit 606 is configured to mold a stem, and form a first protruding portion over the stem. The base and the stem together form the base-stem unit. Attaching unit 608 is configured to attach the stem to the base to form the base-stem unit, such that the stem is substantially perpendicular to the base.

Base-molding unit 604 may, for example, be an injection mold configured to mold a base of a desired shape and size. As discs are generally circular in shape, the base may be suitably made circular in shape. As mentioned above, the base may have a predetermined base radius, depending on the radius of the discs to be stored. The radius of the discs may, for example, range between 30 mm and 60 mm.

Stem-molding unit 606 may, for example, be an injection mold configured to mold a stem of a desired shape and size. The stem so molded may be a hollow or solid tube of the desired shape. The stem may, for example, have a circular shape, an elliptical shape, a triangular shape, a rectangular shape or any other polygonal shape in cross-section. As discs generally have a circular punch area at their centre, the stem may be formed as a tube with a circular shape in cross-section.

In accordance with an embodiment, the stem has a predetermined length being based on at least one of the following: (a) the maximum number of discs to be stored, (b) the type of the discs, and (c) the thickness of the discs. Accordingly, stem-molding unit 606 may be configured to mold the stem of the predetermined length.

In accordance with another embodiment, the stem includes a plurality of hollow tubes that are arranged one within another, and are configured to slide one within another to adjust the length of the stem. Accordingly, stem-molding unit 606 may be configured to mold the hollow tubes of different sizes, and arrange them one within another.

Stem-molding unit 606 is further configured to form the first protruding portion of a desired shape and size. The first protruding portion may, for example, be rectangular or concave polygonal in cross-section.

Cover-molding unit 610 may, for example, be an injection mold configured to mold a cover, and form a first hole having a shape configured to allow the first protruding portion to pass through. Cover-molding unit 610 is configured to mold a cover of a desired shape and size. As discs are generally circular in shape, the cover may be suitably made circular in shape. As mentioned above, the cover may have a predetermined cover radius, depending on the radius of the discs to be stored.

Cover-molding unit 610 is further configured to form the first hole of a desired shape. The first hole may, for example, be rectangular or concave polygonal in cross-section, depending on the shape of the first protruding portion. As mentioned above, the first protruding portion substantially fits into the first hole. The first hole may be formed slightly larger than the first protruding portion, enabling the first protruding portion to enter smoothly into the first hole at an open position.

Cover-molding unit 610 may be further configured to form a recessed portion adjacent to the first hole on which the first protruding portion rests in a locked position. The recessed portion may, for example, have a recessed shape that is complementary to the shape of the first protruding portion.

Cover-placing unit 612 is configured to place the cover over the stem, such that the protruding portion of the stem enters into the hole of the cover at the open position. Cover-placing unit 612 may, for example, be a pick-and-place unit that picks the cover, and aligns and places it over the stem.

Cover-rotating unit 614 is configured to rotate the cover about a longitudinal axis of the stem, to lock the cover to the stem at the locked position, thereby packaging the discs in the package. Cover-rotating unit 614 may, for example, be a rotating unit that holds the cover and rotates it about the longitudinal axis of the stem. The rotating unit may, for example, rotate the cover at an angle of rotation ranging between 20 degrees and 360 degrees, to lock the package. The rotating unit may be integrated into the pick-and-place unit, wherein the pick-and-place unit may be programmed to rotate the cover after placing it over the stem.

As mentioned above, the stem substantially perpendicularly extends along the central longitudinal axis 112 from the base, and is fixed to the base, in accordance with an embodiment. In such a case, base-molding unit 604, stem-molding unit 606 and attaching unit 608 may be a single unit that molds a base with a fixed stem.

In accordance with another embodiment, the stem is detachably attached to the base. In such a case, the base and the stem are molded separately. Stem-molding unit 606 is configured to form a second protruding portion over the stem, while base-molding unit 604 is configured to form a second hole having a shape configured to allow the second protruding portion to pass through the second hole. Further, attaching unit 608 is configured to place the stem over the base, such that the second protruding portion enters the second hole, and rotate the base about a longitudinal axis of the stem, to detachably attach the stem to the base.

In another embodiment of the system shown in FIG. 6, the stem is integrally attached or molded to the base such that the base and stem are a one piece unitary structure.

FIG. 6 is merely an example, which should not unduly limit the scope of the claims herein. One of ordinary skill in the art would recognize many variations, alternatives, and modifications of embodiments.

Figure 7:
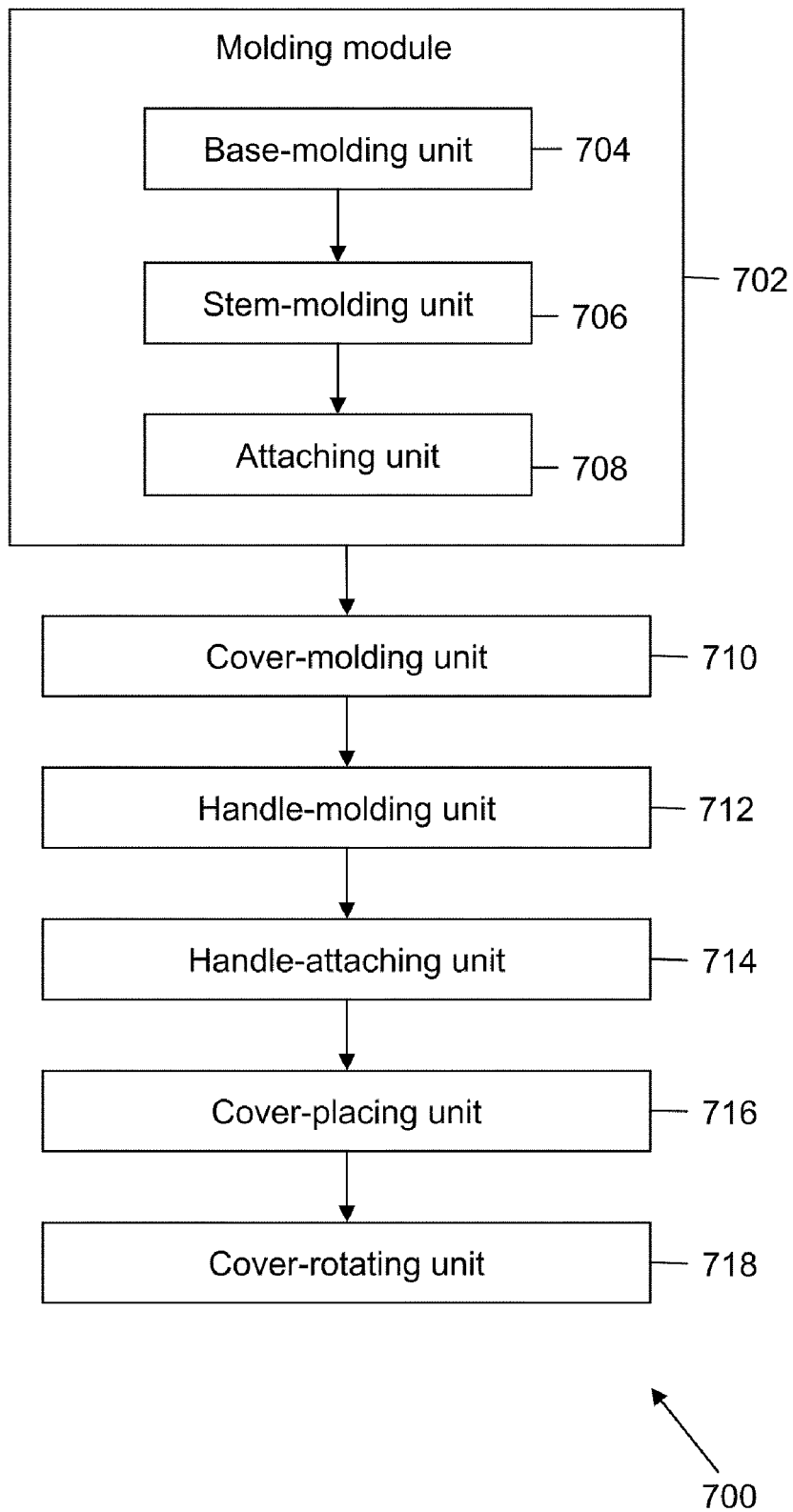
FIG. 7 illustrates a system for manufacturing a package for storing discs, in accordance with another embodiment.

FIG. 7 illustrates a system 700 for manufacturing a package for storing discs, in accordance with another embodiment. System 700 includes a molding module 702 configured to mold a base-stem unit for holding the discs. Molding module 702 includes a base-molding unit 704, a stem-molding unit 706 and an attaching unit 708. System 700 also includes a cover-molding unit 710, a handle-molding unit 712, a handle-attaching unit 714, a cover-placing unit 716 and a cover-rotating unit 718.

Base-molding unit 704 is configured to mold a base, while stem-molding unit 706 is configured to mold a stem, and form a first protruding portion over the stem. The base and the stem together form the base-stem unit. Attaching unit 708 is configured to attach the stem to the base to form the base-stem unit, such that the stem is substantially perpendicular to the base.

Base-molding unit 704 may, for example, be an injection mold configured to mold a base of a desired shape and size. As discs are generally circular in shape, the base may be suitably made circular in shape. As mentioned above, the base may have a predetermined base radius, depending on the radius of the discs to be stored. The radius of the discs may, for example, range between 30 mm and 60 mm.

Stem-molding unit 704 may, for example, be an injection mold configured to mold a stem of a desired shape and size. The stem so molded may be a hollow or solid tube of the desired shape. The stem may, for example, have a circular shape, an elliptical shape, a triangular shape, a rectangular shape or any other polygonal shape in cross-section. As discs generally have a circular punch area at their centre, the stem may be formed as a tube with a circular shape in cross-section.

In accordance with an embodiment, the stem has a predetermined length being based on at least one of the following: (a) the maximum number of discs to be stored, (b) the type of the discs, and (c) the thickness of the discs. Accordingly, stem-molding unit 706 may be configured to mold the stem of the predetermined length.

In accordance with another embodiment, the stem includes a plurality of hollow tubes that are arranged one within another, and are configured to slide one within another to adjust the length of the stem. Accordingly, stem-molding unit 706 may be configured to mold the hollow tubes of different sizes.

Stem-molding unit 706 is further configured to form the first protruding portion of a desired shape and size. The first protruding portion may, for example, be rectangular or concave polygonal in cross-section.

Cover-molding unit 710 may, for example, be an injection mold configured to mold a cover, and form a first hole having a shape configured to allow the first protruding portion to pass through. Cover-molding unit 710 is configured to mold a cover of a desired shape and size. As discs are generally circular in shape, the cover may be suitably made circular in shape. As mentioned above, the cover may have a predetermined cover radius, depending on the radius of the discs to be stored.

Cover-molding unit 710 is further configured to form the first hole of a desired shape. The first hole may, for example, be rectangular or concave polygonal in cross-section, depending on the shape of the first protruding portion. As mentioned above, the first protruding portion substantially fits into the first hole. The first hole may be formed slightly larger than the first protruding portion, enabling the first protruding portion to enter smoothly into the first hole at an open position.

Cover-molding unit 710 may be further configured to form a recessed portion adjacent to the first hole on which the first protruding portion rests in a locked position. The recessed portion may, for example, have a recessed shape that is complementary to the shape of the first protruding portion.

Cover-molding unit 710 is further configured to form a plurality of ridges on the cover, and form at least one cavity on an inner side of each ridge, similar to cavity 308a shown in FIG. 3.

Handle-molding unit 712 is configured to mold a handle that can be detachably attached to the cover. Handle-molding unit 712 may, for example, be an injection mold configured to mold a handle of a desired shape and size. For example, the handle may be made semi-circular in shape. The handle so molded has flexible elements, similar to flexible element 404a and flexible element 404b shown in FIG. 4. These flexible elements are configured to fit into cavities formed on the ridges of the cover.

Handle-attaching unit 714 is configured to attach the handle to the cover. Handle-attaching unit 714 may, for example, be a pick-and-place unit that picks the handle, and aligns and places it over the cover, such that the flexible elements on the handle fit into the cavities on the cover. In this way, the handle is detachably attached to the cover.

Cover-placing unit 716 is configured to place the cover over the stem, such that the protruding portion of the stem enters into the hole of the cover at the open position. Cover-placing unit 716 may, for example, be a pick-and-place unit that picks the cover, and aligns and places it over the stem.

Cover-rotating unit 718 is configured to rotate the cover about a longitudinal axis of the stem, to lock the cover to the stem at the locked position, thereby packaging the discs in the package. Cover-rotating unit 718 may, for example, be a rotating unit that holds the cover and rotates it about the longitudinal axis of the stem. The rotating unit may, for example, rotate the cover at an angle of rotation ranging between 20 degrees and 360 degrees, to lock the package. The rotating unit may be integrated into the pick-and-place unit, wherein the pick-and-place unit may be programmed to rotate the cover after placing it over the stem.

As mentioned above, the stem substantially perpendicularly extends along a central longitudinal axis 112 from the base, and is fixed to the base, in accordance with an embodiment. In such a case, base-molding unit 704, stem-molding unit 706 and attaching unit 708 may be a single unit that molds a base with a fixed stem.

In accordance with another embodiment, the stem is detachably attached to the base. In such a case, the base and the stem are molded separately. Stem-molding unit 706 is configured to form a second protruding portion over the stem, while base-molding unit 704 is configured to form a second hole having a shape configured to allow the second protruding portion to pass through. Further, attaching unit 708 is configured to place the stem over the base, such that the second protruding portion enters the second hole, and rotate the base about a longitudinal axis of the stem, to detachably attach the stem to the base.

In another embodiment of system shown in FIG. 7, the stem is integrally attached or molded to the base such that the base and stem are a one piece unitary structure.

FIG. 7 is merely an example, which should not unduly limit the scope of the claims herein. One of ordinary skill in the art would recognize many variations, alternatives, and modifications of embodiments.

Figure 8:
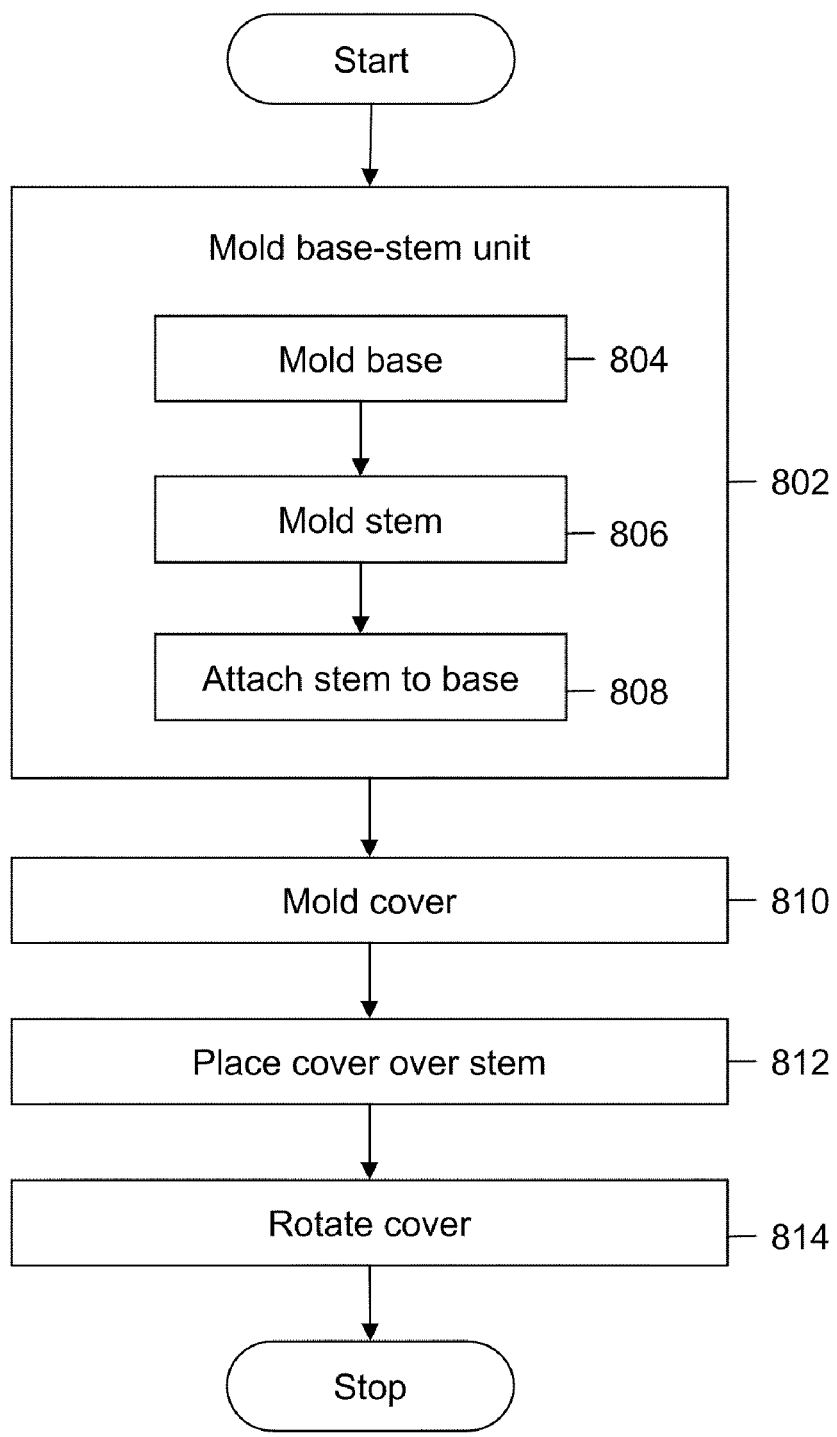
FIG. 8 illustrates a method of manufacturing a package for storing discs, in accordance with an embodiment.

FIG. 8 illustrates a method of manufacturing a package for storing discs, in accordance with an embodiment. The method is illustrated as a collection of steps in a logical flow diagram, which represents a sequence of steps that can be implemented in hardware, or a combination of hardware and software.

At step 802, a base-stem unit for holding the discs is molded. Step 802 includes steps 804-808. At step 804, a base is molded. Step 804 may, for example, be performed by an injection mold configured to mold a base of a desired shape and size. At step 806, a stem is molded, and a protruding portion is formed over the stem. Step 806 may, for example, be performed by an injection mold configured to mold a stem of a desired shape and size. As mentioned above, the base and the stem together form the base-stem unit. Next, at step 808, the stem is attached to the base to form the base-stem unit, such that the stem is substantially perpendicular to the base.

At step 810, a cover is molded, and a hole having a shape configured to allow protruding portion to pass through is formed on the cover. The cover so molded is configured to be locked to the stem. Step 810 may, for example, be performed by an injection mold configured to mold a cover of a desired shape and size.

At step 812, the cover is placed over the stem, such that the protruding portion enters into the hole at an open position. Subsequently, at step 814, the cover is rotated about a longitudinal axis of the stem, to lock the cover to the stem at a locked position. Steps 812 and 814 may, for example, be performed by a pick-and-place unit that picks the cover, aligns and places the cover over the stem, and rotates the cover about the longitudinal axis of the stem.

In another embodiment of method shown in FIG. 8, the stem is integrally attached or molded to the base such that the base and stem are a one piece unitary structure.

It should be noted here that steps 802-814 are only illustrative and other alternatives can also be provided where steps are added, one or more steps are removed, or one or more steps are provided in a different sequence without departing from the scope of the claims herein. For example, steps 802 and 810 may be performed simultaneously.

Figure 9:
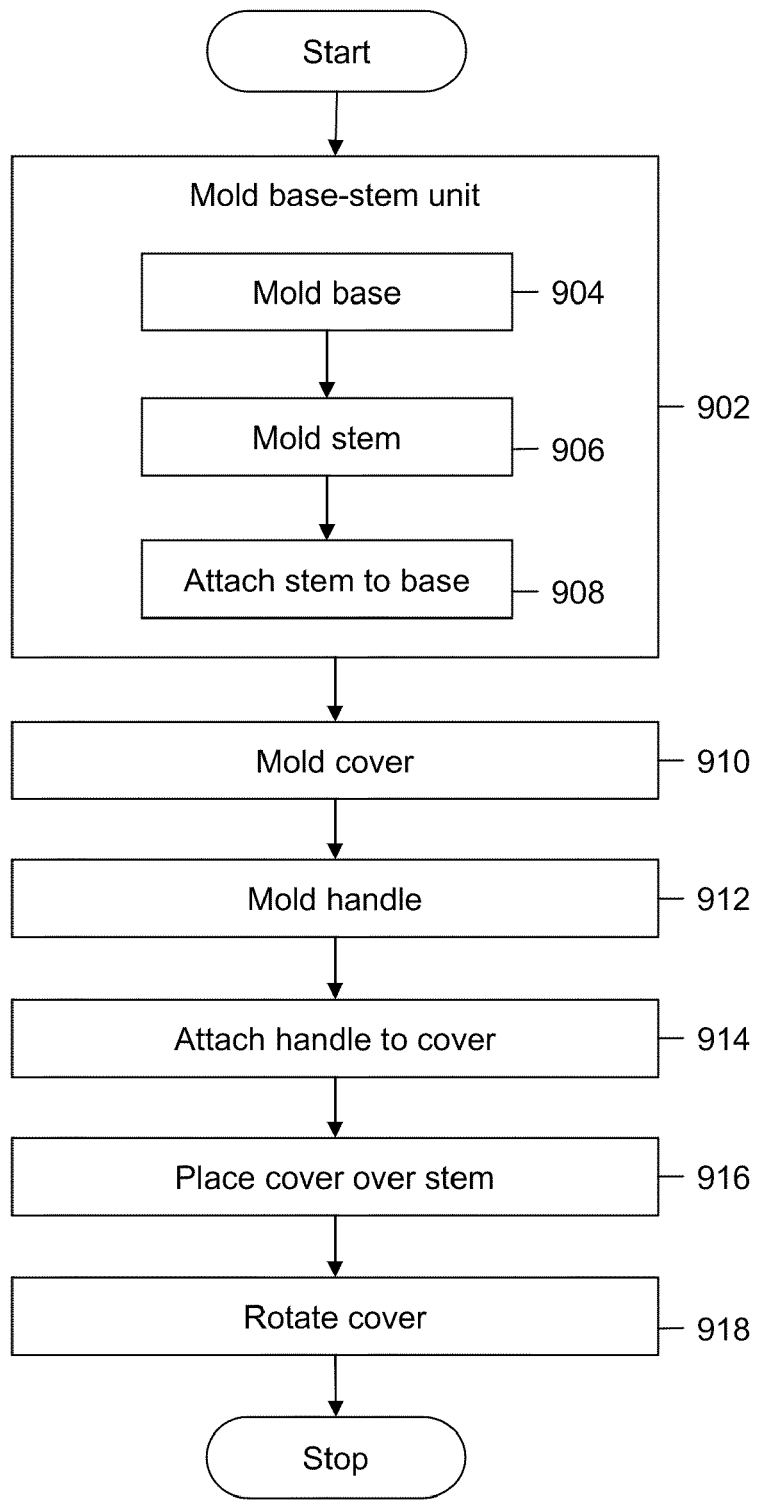
FIG. 9 illustrates a method of manufacturing a package for storing discs, in accordance with another embodiment.

FIG. 9 illustrates a method of manufacturing a package for storing discs, in accordance with another embodiment. The method is illustrated as a collection of steps in a logical flow diagram, which represents a sequence of steps that can be implemented in hardware or a combination of hardware and software.

At step 902, a base-stem unit for holding the discs is molded. Step 902 includes steps 904-908. At step 904, a base is molded. Step 904 may, for example, be performed by an injection mold configured to mold a base of a desired shape and size. At step 906, a stem is molded, and a protruding portion is formed over the stem. Step 906 may, for example, be performed by an injection mold configured to mold a stem of a desired shape and size. As mentioned above, the base and the stem together form the base-stem unit. Next, at step 908, the stem is attached to the base to form the base-stem unit, such that the stem is substantially perpendicular to the base.

At step 910, a cover is molded, and a hole having a shape configured to allow protruding portion to pass through is formed on the cover. The cover so molded is configured to be locked to the stem. Step 910 may, for example, be performed by an injection mold configured to mold a cover of a desired shape and size. In addition, at step 910, a plurality of ridges are formed on the cover, and at least one cavity is formed on an inner side of each ridge.

At step 912, a handle is molded. The handle is configured to be detachably attached to the cover. Step 912 may, for example, be performed by an injection mold configured to mold a handle of a desired shape and size. In addition, the handle so formed has flexible elements that are configured to fit into cavities formed on the ridges of the cover.

At step 914, the handle is attached to the cover. The handle is placed over the cover, such that the flexible elements on the handle fit into the cavities on the cover. In this way, the handle is detachably attached to the cover.

At step 916, the cover is placed over the stem, such that the protruding portion enters into the hole at an open position. Subsequently, at step 918, the cover is rotated about a longitudinal axis of the stem, to lock the cover to the stem at a locked position. Steps 916 and 918 may, for example, be performed by a pick-and-place unit that picks the cover, aligns and places the cover over the stem, and rotates the cover about the longitudinal axis of the stem.

In another embodiment of the method shown in FIG. 9, the stem is integrally attached or molded to the base such that the base and stem are a one piece unitary structure.

It should be noted here that steps 902-918 are only illustrative and other alternatives can also be provided where steps are added, one or more steps are removed, or one or more steps are provided in a different sequence without departing from the scope of the claims herein. For example, steps 902, 910 and 912 may be performed simultaneously.

Figure 10:
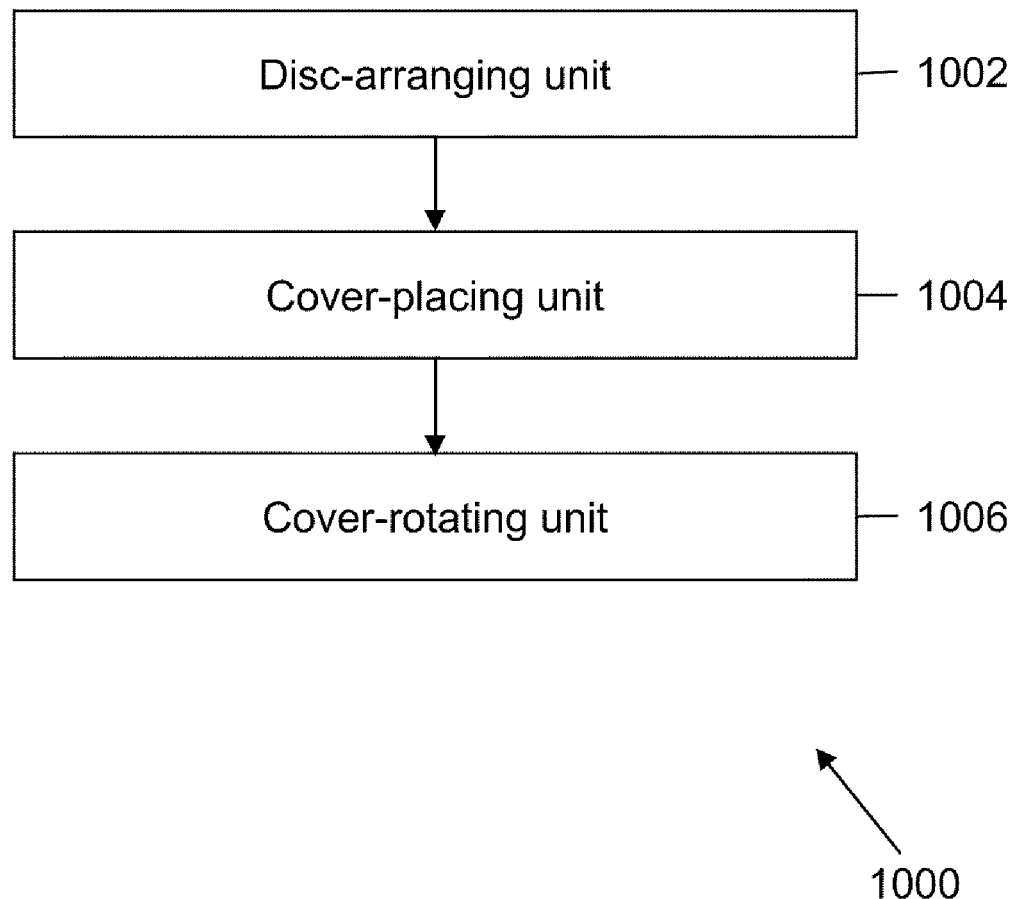
FIG. 10 illustrates a system for packaging discs in a package, in accordance with an embodiment.

FIG. 10 illustrates a system 1000 for packaging discs in a package, in accordance with an embodiment. The package includes a base, a stem substantially perpendicular to the base, and a cover. The stem includes a protruding portion, while the cover includes a hole having a shape configured to allow the protruding portion to pass through. System 1000 includes an disc-arranging unit 1002, a cover-placing unit 1004, and a cover-rotating unit 1006.

Disc-arranging unit 1002 is configured to arrange a plurality of discs one above another in a stack. Disc-arranging unit 1002 may, for example, be a pick-and-place unit configured to pick the stack of discs and place it over the base, such that the discs are held together with the stem. Dummy discs with no recording layer may be packed on the ends of the stack to avoid scratches from direct contact with the package.

Cover-placing unit 1004 is configured to place the cover over the stem, such that the protruding portion enters into the hole at an open position. Cover-placing unit 1004 may, for example, be a pick-and-place unit configured to pick the cover, and align and place it over the stem.

Cover-rotating unit 1006 is configured to rotate the cover about a longitudinal axis of the stem, to lock the cover to the stem at a locked position. Cover-rotating unit 1006 may, for example, be a rotating unit configured to hold the cover and rotate it about the longitudinal axis of the stem. The rotating unit may, for example, rotate the cover at an angle of rotation ranging between 20 degrees and 360 degrees, to lock the package. The rotating unit may be integrated into the pick-and-place unit, wherein the pick-and-place unit may be programmed to rotate the cover after placing it over the stem.

In another embodiment of the system shown in FIG. 10, the stem is integrally attached or molded to the base such that the base and stem are a one piece unitary structure.

FIG. 10 is merely an example, which should not unduly limit the scope of the claims herein. One of ordinary skill in the art would recognize many variations, alternatives, and modifications of embodiments.

Figure 11:
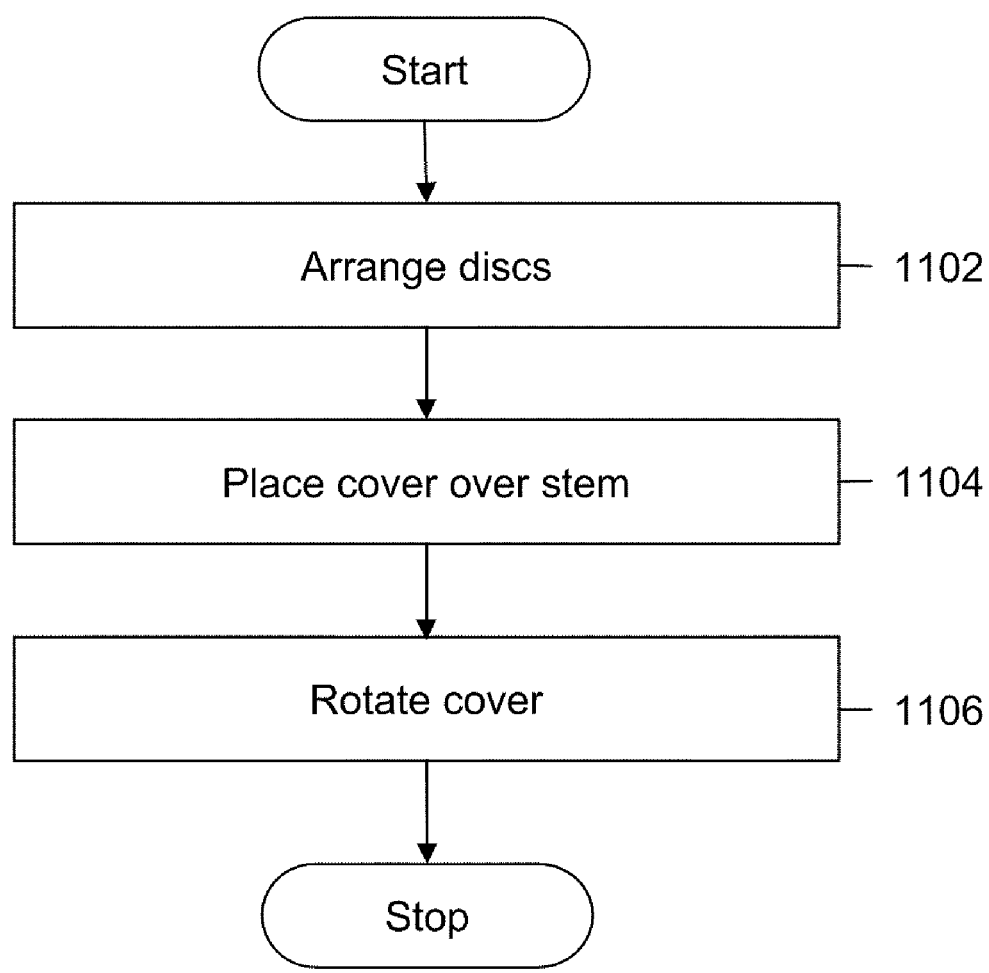
FIG. 11 illustrates a method of packaging discs in a package, in accordance with an embodiment.

FIG. 11 illustrates a method of packaging discs in a package, in accordance with an embodiment. The method is illustrated as a collection of steps in a logical flow diagram, which represents a sequence of steps that can be implemented in hardware or a combination of hardware and software.

As mentioned above, the package includes a base, a stem substantially perpendicular to the base, and a cover. The stem includes a protruding portion, while the cover includes a hole having a shape configured to allow the protruding portion to pass through.

At step 1102, a plurality of discs are arranged one above another in a stack. As mentioned above, dummy discs with no recording layer may be packed on the ends of the stack to avoid scratches from direct contact with the package. Step 1102 may, for example, be performed by be a pick-and-place unit that picks the stack of discs and places it over the base, such that the discs are held together with the stem.

At step 1104, the cover is placed over the stem, such that the protruding portion enters into the hole at an open position. Subsequently, at step 1106, the cover is rotated about a longitudinal axis of the stem, to lock the cover to the stem at a locked position. Steps 1104 and 1106 may, for example, be performed by a pick-and-place unit that picks the cover, aligns and places the cover over the stem, and rotates the cover about the longitudinal axis of the stem.

It should be noted here that steps 1102-1106 are only illustrative and other alternatives can also be provided where steps are added, one or more steps are removed, or one or more steps are provided in a different sequence without departing from the scope of the claims herein.

In another embodiment of the method shown in FIG. 11, the stem is integrally attached or molded to the base such that the base and stem are a one piece unitary structure.

Embodiments provide a package for storing discs (and manufacturing and packaging methods and systems thereof). The package includes a base, a stem for holding the discs, and a cover configured to be locked to the stem. As described earlier, the cover has to be rotated at an angle of rotation ranging between 20 degrees and 360 degrees, to lock and unlock the package. This provides an easy-to-use locking and unlocking mechanism.

In addition, the design of the cover avoids any accidental unlocking of the package, while it is being carried. This makes the locking and unlocking mechanism reliable.

Further, a detachable handle is provided for carrying the package. The handle may be manually attached or detached when desired. This makes the package easy to carry and handle.

Moreover, the length of the stem can be adjusted to accommodate changing numbers of discs to be stored.

Furthermore, the package so designed requires lesser amount of manufacturing material, compared to conventional disc packages. This, in turn, makes the package light weight.

What is claimed is:

1. A package for storing discs, said package comprising:
 a base;
 a stem, said stem comprising:
  a first end comprising a first protruding portion of a first predetermined protruding shape; and
  a second end comprising a second protruding portion of a second predetermined shape, said second end attached to said base, such that said stem is substantially perpendicular to said base; and
 a cover configured to be locked to said first end of said stem, said cover comprising a first hole having a shape configured to allow said first predetermined protruding shape to pass through said first hole;
 wherein said cover is configured to be placed over said stem such that said first protruding portion enters into said first hole at an open position of said first hole, and said cover is configured to be rotated about a longitudinal axis of said stem to lock said package at a locked position of said first hole such that said first protruding portion extends beyond at least a portion of said first hole; and
 wherein, said base comprises a second hole having a shape configured to allow said second predetermined protruding shape to pass through said second hole, said stem is configured to be placed over said base such that said second protruding portion enters said second hole, said base is configured to be rotated about said longitudinal axis of said stem to detachably attach said second end of said stem to said base.

2. The package of claim 1, wherein said cover further comprises a recessed portion adjacent to said first hole, said first protruding portion rests on said recessed portion in said locked position.

3. The package of claim 1 further comprising a handle for carrying said package, wherein said handle is configured to be detachably attached to said cover.

4. The package of claim 1, wherein said second end of said stem is integrally attached to said base such that said base and said stem are a one piece unitary structure.

5. The package of claim 1, wherein said cover is configured to be rotated at an angle of rotation ranging between 20 degrees and 360 degrees, to lock and unlock said package.

6. The package of claim 1, wherein said cover is configured to be rotated about said longitudinal axis of said stem to unlock said package at said open position.

7. The package of claim 1, wherein said stem has a predetermined length, said predetermined length being based on at least one of the following: (a) the maximum number of said discs to be stored, (b) the type of said discs, and (c) the thickness of said discs.

8. The package of claim 1, wherein said base has a predetermined base radius and said cover has a predetermined cover radius, said predetermined base radius and said predetermined cover radius are based on the radius of said discs to be stored.

9. The package of claim 1, wherein said second end of said stem is integrally molded to said base such that said base and said stem are a one piece unitary structure.

10. The package of claim 1, wherein said first hole of said cover is non-threaded.

11. A system for packaging discs in a package, said package comprising a base, a stem substantially perpendicular to said base, and a cover, said stem comprising a protruding portion and said cover comprising a hole having a shape configured to allow said protruding portion to pass through said hole, the system comprising:
- a disc-arranging unit configured to arrange said discs one above another in a stack, wherein said discs are held together with said stem;
- a cover-placing unit configured to place said cover over said stem, such that said protruding portion enters into said hole at an open position of said hole;
- a cover-rotating unit configured to rotate said cover about a longitudinal axis of said stem to lock said cover to said stem at a locked position of said hole such that said protruding portion extends beyond at least a portion of said hole; and
- an attaching unit configured to attach said stem to said base, wherein a base-stem unit is configured to rotate said base about said longitudinal axis of said stem to detachably attach said base to said stem.

12. The system of claim 11, wherein said stem is integrally attached or molded to said base such that said base and said stem are a one piece unitary structure.

13. A method of packaging discs in a package, said package comprising a base, a stem substantially perpendicular to said base, and a cover, said stem comprising a first protruding portion, a second protruding portion, wherein, said cover comprising a first hole having a shape configured to allow said first protruding portion to pass through said first hole, and said base comprising a second hole having a shape configured to allow said second protruding portion to pass through said second hole, the method comprising:
- placing said stem over said base, such that said second protruding portion enters said second hole;
- rotating said base about a longitudinal axis of said stem, to detachably attach said stem to said base;
- arranging said discs one above another in a stack, wherein said discs are held together with said stem;
- placing said cover over said stem, such that said first protruding portion enters into said first hole at an open position of said first hole; and
- rotating said cover about said longitudinal axis of said stem to lock said cover to said stem at a locked position of said first hole such that said first protruding portion extends beyond at least a portion of said first hole.

14. The method of claim 13, wherein said stem is integrally attached or molded to said base such that said base and said stem are a one piece unitary structure.

* * * * *